Patented May 7, 1935

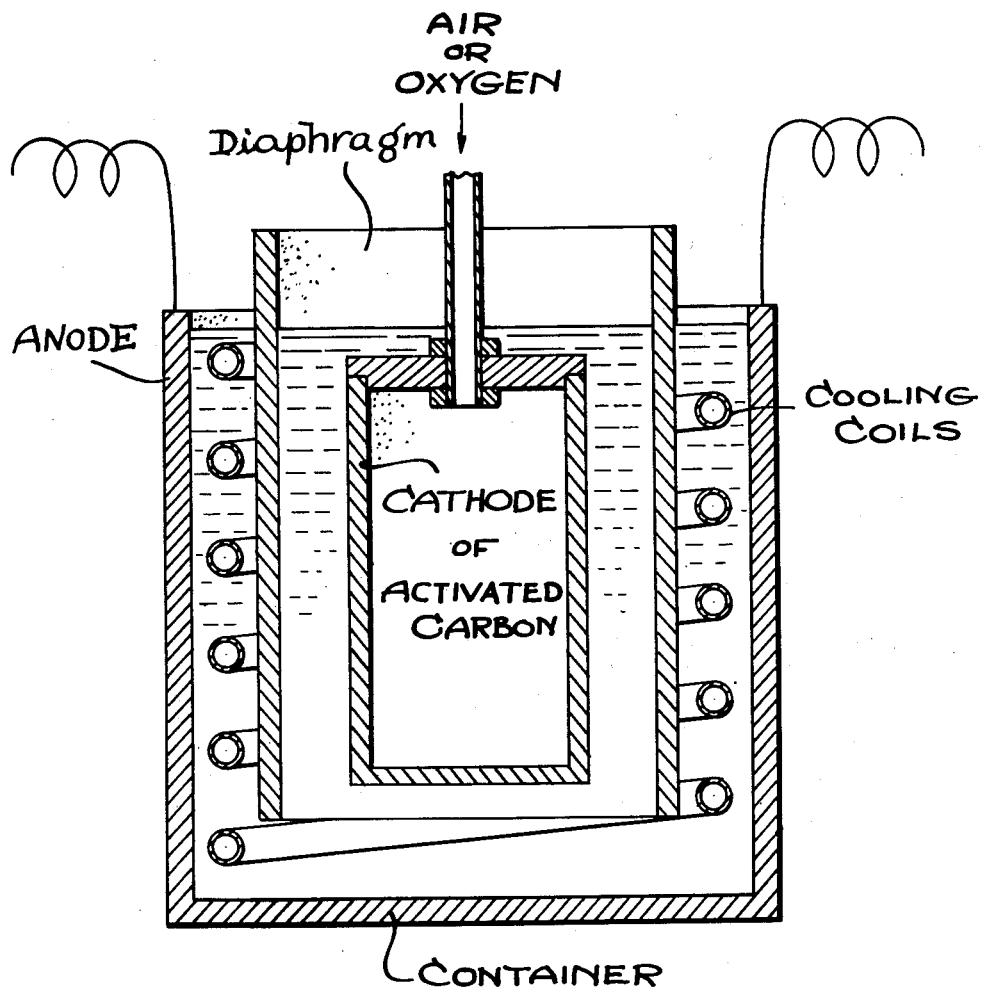

2,000,815

UNITED STATES PATENT OFFICE 2,000,815

PROCESS FOR CARRYING OUT ELECTROCHEMICAL REACTIONS

Ernst Berl, Darmstadt, Germany, assignor to The Mathieson Alkali Works, Inc., a corporation of Virginia Application September 30, 1931, Serial No. 566,155
In Germany February 3, 1928

18 Claims. (Cl. 204—9)

This invention relates to improvements in the conduct of current-consuming electro-chemical reactions and in electrodes for carrying out such reactions. More specifically, the invention relates to improvements in the electro-chemical production of hydrogen peroxide and per salts such as perborates.

The electrodes of the invention are characterized in that they consist wholly or in part of active carbon, that is to say, carbon which has an effective surface of, for example, 50 square metres and more per gram, such as may be obtained, for example in known manner by the heating of carbon which has no, or only slight absorptive activity such as, for example, ordinary wood charcoal, with activating gases, such as water vapour, air or carbon monoxide or with substances such as zinc chloride, alkali salts and the like or from other initial materials, such as, for example water soluble acid tars and the like.

Such electrodes have proved to be advantageous in connection with numerous current consuming electrochemical reactions involving the decomposition of cathodical or anodical products deposited on the electrodes, by means of substances introduced at the electrodes, for example from an extraneous source, in particular gases such as, for example, oxygen or hydrogen, and to do what has hitherto not been possible, to obtain so great a concentration of said substances, in particular gases, at the electrode surfaces that the decomposition in question can take place with sufficient speed or in the desired direction. Thus for example, in the known process for the production of hydrogen peroxide by cathodic reduction of elementary oxygen gas and the like, it has been necessary to maintain the oxygen at the cathode under an extraordinarily high pressure in order to effect a sufficient reduction, whilst other problems in the electrolytic treatment of gases, for example, the cathodic reduction of elementary nitrogen to ammonia has hitherto proceeded with such slowness, in consequence of the difficulties encountered, that it has not been possible to carry it out in a practical manner.

By the use of the electrodes which according to the invention consist entirely or in part of active carbon it is now possible to bring the substances, for instance the gaseous substances, introduced at the electrodes, into contact with the products electrolytically separated at the electrodes, for instance in the electrode surface, without the use of high pressures, in such high concentration, that in this way electro-chemical processes, such as for instance the reduction of oxygen to hydrogen peroxide by means of cathodic hydrogen, can be carried out with practically useful speed, electro-chemical which it was not possible previously to carry out or at best only with great difficulty, for instance by employing high pressures, with the electrode materials previously available.

The material used according to the invention differs from known electrode materials by the very different order of magnitude of the surface of evolution. By employing the electrodes of the present invention, many electrochemical processes are for the first time made possible in the practical sense. Examples of these are the manufacture of easily decomposable materials such as hydrogen peroxide, in which by the use of hitherto known electrodes the velocities of the catalytic decomposition exceeds the velocities of formation so that in many cases not a trace of the desired product, can be discovered even with the most delicate reagents.

The electrodes may be manufactured wholly or in part of active material. This material may be initially active or may be activated by special treatments such as for instance according to the usual process of formation, or the activation, for instance superficial, wholly or in part may be effected during or after the shaping. If necessary the activating procedure can also be employed, for instance for the purpose of regenerating their activity, for instance according to a known regenerating process, after the electrodes have been used.

An electrode manufactured from a porous, preferably coarse grained carbon, can also be entirely or in part impregnated with activating materials or solutions of such materials and then, can be activated for instance, by heating.

Such a porous, particularly coarse grained, electrode body of carbon or other conducting material can also be impregnated entirely or in part with organic or partly organic substances or solutions of such, which deposit active carbon in the pores or on the walls of the pores of the electrodes on decomposition and suitable after-treatment, for instance heating.

In order to increase the activity or to carry out special reactions, catalytically active substances of various kinds may be deposited in a manner known per se, on the surface of the electrodes in any stage of the manufacturing process or may be incorporated in the electrode mass itself before or after the activation or be incorporated in the electrode mass itself, if necessary only to a certain depth, for instance by impregnating the electrodes with solutions of suitable substances. For this purpose positively acting, that is those which favour the decomposition desired, as well as negatively acting catalysts, that is those which are suitable for preventing undesired reactions, for instance the decomposition of the reaction products such as hydrogen peroxide, for instance by arresting the detrimental action of the decomposition catalysts present in the electrolytes or deposited on the electrodes, may be employed. Such negative catalysts can be used in acid, neutral or alkaline electrolytes. Suitable catalysts are, for example the nitrose naphthols, such as for instance β-nitrose naphthol, which have proved to be particularly suitable for working in alkaline solution and salicylic acid particularly suitable for working in acid solutions.

In order to improve the conductivity, the electrodes can likewise be provided in a manner known per se with insertions of a material of higher conductivity, such graphite, as metal, metal gauze or the like, for instance by introducing the active carbon into a lattice of better conducting material in a manner similar to that employed in accumulator gratings.

According to another method of carrying out the invention the electrodes manufactured in the manner described are provided with an extremely thin coating of a material repellant to the electrolyte, for example, of a water repellant material such as paraffin by using a watery electrolyte, for instance by dipping the electrode for a short time into a mass rendered liquid by melting or solution, in order to prevent the moistening of the activated carbon by the electrolytes, with consequent lowering of the efficiency. The impregnating of the usual carbon electrodes with larger quantities of, paraffin is known. However, activated carbon thus treated would not differ essentially in its efficiency from ordinary elemental carbon. My researches have, however, shown that a coating, for example, of paraffin of such thinness that it does not influence the active properties of the carbon in any considerable manner is still sufficient to prevent the wetting in an efficient manner.

By using electrodes prepared in such a way, the particular advantage is also obtained, as experiments have shown, that an extraordinary decrease in the catalytically decomposing action of the electrode materials on the products of the electrolysis is obtained which is particularly important for the manufacture of easily catalytically decomposable products, such as hydrogen peroxide and the like.

Electrodes of the type described are usable as cathodes and/or as anodes in electrolytic current consuming of the most varied type, of which besides the already mentioned manufacture of hydrogen peroxide may be mentioned: the electrolytic manufacture of perborates, the manufacture of ammonia by the cathodic reduction of nitrogen, combustion cells, as well as all electrolytic processes, in which it is important to put a gaseous, liquid or solid substance in high concentration in the electrode surface employed for the decomposition into contact with the primary or secondary products separated at the one electrode. Likewise they can be used with special advantage, for instance in the electrolytic working up of substances which are only slightly soluble in the electrolytes, more particularly substances of organic nature, which could in general, previously only be subjected with incomplete result to electrolytic treatment, for instance to electrolytic reduction or oxidation, by suspending them in electrolytes, which, however, did not usually lead to the necessary concentration at the surface of the electrodes, and also considerably increased the difficulty of carrying out the electrolysis from a technical point of view on account of it being necessary to use powerful stirring devices.

When working with gases it has been found to be advisable to lead the gases to the active surface of the carbon electrodes from a point within the electrodes, for example by diffusion through the mass of the electrode, for instance by introducing the gas used from the inside of a pipe serving as the electrode and made entirely of active carbon or active or activated only on its outer surface or covered with activated carbon, while the outer surface of the pipe is in contact with an electrolyte or vice versa.

In some cases it is possible instead of leading the gases to the electrodes by special pipes, to effect the concentration of such gases at the active surface of the electrodes by arranging the current consuming cell with electrodes projecting from the electrolyte for example with their upper portion, into a chamber filled with the required gas, or even by placing only the upper end or opening of a hollow electrode which is, for example constructed in pipe shape, if necessary filled with porous material, for instance fine or coarse grained carbon, in connection with such a gas chamber.

This method of working has for instance advantages in electrolytic processes in which the oxygen (or nitrogen) of the air is used as the reacting gas in which the taking up of the oxygen with diffusion through the porous carbon electrode takes place directly in known manner from the surrounding air and where an increased activity of one hundredfold to two hundredfold can under some circumstances be obtained by the use of electrodes of active carbon according to the present invention owing to the increased adsorption power for oxygen of the carbon which is extraordinarily raised.

As the use of the electrodes consisting wholly or partly of activated carbon according to the invention is only restricted with reference to working temperature by temperatures at which the activity of the material is not prejudiced, such electrodes can be used in many cases, for instance for the electrolysis of fused salts.

Furthermore, electrodes according to the present invention may be employed at ordinary pressures as well as at increased or diminished pressures.

The accompanying drawing illustrates one form of apparatus for carrying out the process.

*Examples*

1. As shown in the drawing air or oxygen is forced from the inside through a highly porous carbon pipe, the walls of the pores of which are covered with good conducting high activated carbon and which is the cathode in an acid, neutral or alkaline solution separated by a diaphragm from a, for example non-attackable anode in the same or another solution. The activation of the walls of the pores of the cathode pipe may be effected, for instance according to my prior Patent No. 1,812,316 by impregnating the pipe with potassium salts of soluble acid tars and heating. Instead of a pipe made of carbon, it is possible to use as current conducting element one of some other conducting material which has been impregnated in a suitable manner with active carbon. The oxygen dissolved in the active carbon of the electrode reacts with the cathodically evolved hydrogen with the formation of hydrogen peroxide. With a cathodic current density of 5 amp./sq. dm. 2–3 volts potential and a temperature of about 5° C. up to 5% concentrations of hydrogen peroxide are obtained with a current output of 66%.

In contradistinction thereto when using electrodes of the usual non-active wood charcoal hydrogen peroxide is not obtained or only in extremely small concentrations.

In a similar manner the reactions at the anode can be used according to processes known per se for the formation of persulphates or perborates. When working according to the invention a further advantage is also obtained in that a diaphragm is unnecessary.

2. The cathode is as in Example 1. The anode is of platinum with a surface one third of that of the cathode. The electrolyte solutions are soda or bicarbonate and borate. With a cathode current density of 5 amp./sq. dm. and, an anode current density of 15 amp./sq. dm., at a potential of about 10 volts and a temperature of 5° C. solid perborate in good yield separates out at both electrodes.

By the term "catalytically acting substances", is to be understood such substances as are suitable for assisting the desired reaction. By the term "positively acting catalysts" is to be understood those which are suitable for accelerating the course of the reaction as such, and by the term "negatively acting catalysts" those which are suitable for assisting the reaction process indirectly by retarding detrimental action, such as for instance the decomposition of the desired reaction products caused by the decomposition catalysts in the electrolytes or on or in the electrodes. By the term "active carbon" it is to be understood to mean in the specification and in the claims a carbon which has an active surface of at least 50 square meters per gram.

What I claim is:—

1. An electrode for carrying out electrochemical reactions containing active carbon and provided with an extremely thin coating of an electrolyte repellant substance covering at least a part of said electrode.

2. The electrolytic process of producing oxygen-containing compounds which comprises passing an electrical current through an electrolyte adapted to produce said oxygen-containing compounds via an electrode containing active carbon.

3. The process of effecting current-consuming electrochemical reactions, which comprises passing an electrical current through an electrolyte adapted to carry out said electrode chemical reactions via an electrode containing active carbon.

4. A method of effecting current consuming electrolytical reactions which comprises using electrodes containing active carbon.

5. A method of effecting current consuming electrolytical reactions which comprises using an electrode containing active carbon while leading a gaseous substance reacting with the products deposited on the electrode to the active surface of the electrode from an extraneous source.

6. A method of producing active oxygen-containing compounds by electrolysis which comprises using electrodes containing active carbon.

7. A method of producing hydrogen peroxide by electrolytic reduction of an oxygen containing gas in an aqueous medium which comprises using a cathode containing active carbon while leading the oxygen containing gas to the cathode from without.

8. A method of producing hydrogen peroxide by electrolytic reduction of oxygen in an aqueous medium which comprises using a cathode containing active carbon while leading an oxygen containing gas to the active surface of the cathode in contact with the electrolyte from a point within the cathode by diffusion through the mass of the cathode.

9. A method of producing hydrogen peroxide by electrolytic reduction of oxygen in an aqueous medium which comprises using as cathode a carbon pipe, containing active carbon while forcing an oxygen containing gas from the inside through the walls of the carbon pipe.

10. A process of producing perborates which comprises electrolyzing an alkaline reacting solution of a borate with an anode containing active carbon.

11. A process of producing perborates which comprises electrolyzing an alkaline reacting solution of a borate with a cathode containing active carbon while leading an oxygen containing gas from an extraneous source to the active surface of the cathode.

12. An electrode adapted for use in an electrolytic process of producing oxygen containing compounds on an industrial scale and containing active carbon having an effective surface of at least 50 square meters per gram.

13. An electrode adapted for use in an electrolytic process of producing oxygen containing compounds on an industrial scale which comprises a porous conducting base containing active carbon.

14. An electrode adapted for use in an electrolytic process of producing oxygen containing compounds on an industrial scale which comprises a porous conducting base of carbon having the pores thereof at least partially covered with active carbon.

15. An electrode adapted for use in an electrolytic process of producing oxygen containing compounds on an industrial scale which comprises a base of conducting material provided with hollow spaces like an accumulator grating and active carbon incorporated in said hollow spaces.

16. An electrode adapted for use in an electrolytic process of producing oxygen containing compounds on an industrial scale and containing active carbon having an effective surface of at least 50 square meters per gram and containing a catalytic substance.

17. An electrode for carrying out current-consuming electrochemical reactions containing active carbon and provided with an extremely thin coating of an electrolyte repellant substance covering at least a part of said electrode, said coating consisting essentially of a hydrocarbon of the paraffin series.

18. In the manufacture of hydrogen peroxide and per salts, the improvement which comprises electrolyzing an aqueous solution of an alkali or an alkali salt with a cathode comprising activated carbon while maintaining free oxygen present in the vicinity of the submerged parts of the cathode.

ERNST BERL.